United States Patent [19]

Link et al.

[11] Patent Number: 4,645,219
[45] Date of Patent: Feb. 24, 1987

[54] CHUCK

[75] Inventors: Helmut F. Link, Aichwald; Erich E. Schäfer, Kirchheim-Nabern, both of Fed. Rep. of Germany

[73] Assignee: Index-Werke Komm. Ges. Hahn & Tessky, Esslingen, Fed. Rep. of Germany

[21] Appl. No.: 804,172

[22] Filed: Dec. 3, 1985

[30] Foreign Application Priority Data

Dec. 29, 1984 [DE] Fed. Rep. of Germany ....... 3447786
Nov. 8, 1985 [DE] Fed. Rep. of Germany ....... 3539599

[51] Int. Cl.$^4$ .......................... B23B 31/14; B23B 31/32
[52] U.S. Cl. .................................... 279/1 C; 279/1 D; 279/118
[58] Field of Search .............. 279/1 C, 1 D, 118, 119, 279/106, 109

[56] References Cited

U.S. PATENT DOCUMENTS

1,839,400  1/1932  Lewis ................................. 279/119
3,006,653 10/1961  Benjamin et al. .................. 279/1 D
3,006,654 10/1961  Benjamin ............................ 279/1 D
4,097,053  6/1978  Steinberger ........................ 279/1 C
4,240,645 12/1980  Röhm ................................. 279/1 C Primary Examiner—Gil Weidenfeld
Assistant Examiner—Steven C. Bishop
Attorney, Agent, or Firm—Kramer and Brufsky

[57] ABSTRACT

The invention relates to a chuck in which the clamping jaws are connected with the chuck body via radially deflectable arms. Two flat parallel arms are preferably provided for each clamping jaw. These arms act like leaf springs and form a parallelogram link arrangement for the associated clamping jaw. The clamping jaws and arms are preferably designed in one piece with the chuck body by forming slots in corresponding projections of the chuck body by means of wire erosion. The clamping jaws are actuated in accordance with the invention via a wedge face arrangement comprising a two-armed lever for each clamping jaw. A short arm of the lever engages the associated clamping jaw whereas a wedge face provided on a distinctly longer arm of the lever interacts with an actuating element, in particular a roller, of the axially displaceable actuating member.

22 Claims, 8 Drawing Figures

CHUCK

The invention relates to a chuck comprising a chuck body, clamping jaws displaceable in a radial direction relative to the chuck body, an actuating member movable in an axial direction relative to the chuck body and an arrangement for converting movement to bring about a radial adjusting movement of the clamping jaws in response to an axial adjusting movement of the actuating member.

A chuck or jaw chuck of this type is described in German published application DE-AS No. 29 03 904. In the known chuck, the actuating member is a piston which is displaceable in the chuck body in an axial direction and actuates the clamping jaws via a wedge hook gearing.

In the known jaw chuck and other chucks having wedge hook, wedge bar or angle lever drive means, which are customarily used for clamping workpieces on lathes during machining thereof, the radially displaceable clamping jaws are guided in retaining grooves in the chuck body. The point at which the clamping jaws engage on the workpiece to be clamped during operation is located, in these chucks, in front of the wedge hook connection between clamping jaws and actuating member, when seen in the axial direction. This means that, during clamping, torque acts on the retaining grooves; the amount of torque will depend on the clamping force, on the one hand, and the distance between clamping point and wedge hook connection, on the other. This torque gives rise to high frictional forces in the individual retaining grooves and these forces considerably reduce the clamping force on the workpiece, in particular as a function of the state of lubrication and abrasion of the chuck elements as well. The centrifugal force of the jaws, which increases considerably at higher torque, also has the effect of reducing the clamping force and may be decreased only by reducing the mass or bulk of the jaws. A further disadvantage of the known clamping devices is the play present in the jaw guideways which has a negative effect on the machining accuracy which may be achieved when using such a chuck.

Proceeding on the basis of the state of the art, the object underlying the invention is to improve a chuck of the type described at the outset such that any canting and jamming of the clamping jaws in relation to the chuck body is avoided and accuracy considerably increased. At the same time, production of the chuck is simplified and cheaper since interacting guide faces for the clamping jaws are dispensed with.

This object is accomplished by the invention in that each of the clamping jaws is connected with the chuck body via a pair of arms extending approximately in an axial direction, these arms being resiliently deflectable in a substantially radial direction and acting as a parallel spring link, and that the movement converting arrangement has for each clamping jaw a two-armed lever mounted for pivoting movement relative to the chuck body, the outer arm of this lever being in operative connection with the associated clamping jaw and the inner arm of this lever being in operative connection with the actuating member so as to bring about a pivoting movement of the lever about its pivot axis in response to an axial movement of the actuating member.

The essential advantage of the inventive chuck is the fact that the deflectable arms allow the clamping jaws borne by them to have the required radial mobility and may easily be designed to be adequately torsionally rigid to counteract any canting and jamming of the clamping jaw. This means that the clamping jaw need no longer be guided between guide faces and, consequently, the interaction between the clamping jaw and its guide faces cannot have any disadvantageous results. In addition, high clamping forces result for the clamping jaws when the transmission ratio of the lever is suitably adjusted and the actuating member has a comparatively low axial force. These clamping forces are no longer affected by undefined frictional forces. Furthermore, the inventive movement converting arrangement, which is preferably designed as a wedge face arrangement, may be designed to be self-centering, particularly when the actuating member is designed as a chuck piston displaceable in an axial piston aperture in the chuck body, in such a manner that a high degree of accuracy is achieved when centering a clamped workpiece.

In development of the invention, it has proven advantageous for the arms to be designed as flat, leaf spring-type arms which are very rigid in a direction transverse to the direction of radial deflection.

In a particularly preferred embodiment of the invention, the arms are designed in one piece with the clamping jaws and the chuck body. The production process is such that integral projections are formed on the free end face of the chuck body in the manner of the protrusions of a claw or jaw coupling. Each of these projections is then provided with a slot which separates the clamping jaw from the chuck body, apart from the arms, and forms the inner side of the two arms bearing the relevant clamping jaw. In this one-piece construction of the clamping jaws, arms and chuck body, the slot is preferably formed by wire erosion. First of all, a bore extending substantially in the form of a chord is made in a projection, a wire is subsequently threaded through this bore and the slot profile then eroded with this wire. This construction results in considerable advantages with a view to cost and production. In particular, the thickness of the leaf spring-like arms may be kept to narrow tolerances due to the high precision of the wire erosion process. The block remaining between the arms forms at the same time a stop which prevents any excessive radial deflections of the arms which could lead to permanent deformations.

In the case of the integral design of the clamping jaws, arms and chuck body, it has proven advantageous for the slots to be filled with a rubber elastic filling material after completion. This material prevents clogging of the slots, in particular drillings or turnings penetrating the slots and prohibiting the free mobility of the arms in relation to the remaining block. In this respect, it is sufficient for the filling material merely to close the open ends of the slots. The slots need not be completely filled. The open ends of these slots may also be closed by lateral cover members.

In addition, it has proven advantageous for the connection between each lever of the wedge face arrangement and the chuck body and/or the associated clamping jaw to be designed as a ball joint connection so that no critical canting and jamming of the clamping jaw may occur.

It has also proven favourable to have pressure springs acting inwardly on the, preferably, relatively long arms of the levers which are remote from the clamping jaws. These pressure springs press the clamping jaws further outwards beyond their neutral position when the actuating member is retracted and this means that the effective radial path of the clamping jaws may be doubled when the arms are radially deflected to their maximum extent.

It has also proven favourable for the actuating elements of the actuating member to be designed as rollers rotatably mounted in relation to the actuating member. These rollers interact with the wedge faces of the levers whilst eliminating interference from frictional forces.

It is particularly favourable, in development of the invention, for the cross section of the arms in their axial direction to be selected such that a constant bending stress results along each of the arms. This is achieved in a preferred embodiment of the invention in that the slot portions defining the arms are not exactly axial but are designed with a radially inwardly or outwardly directed curvature.

In addition, it has proven advantageous for the slot portion extending substantially in a radial direction along the underside of the associated clamping jaw to be curved forwards or rather outwards towards the clamping jaw. This construction allows the pivot axis of the lever to be located particularly close to the clamping jaw and this means that the front or outer arm of the lever is very short and the transmission ratio achieved with the lever is particularly high.

In development of the invention, it has also proven favourable for the central end face region of the chuck body located between the radially inward ends of the clamping jaws or the inner arms to be designed as a plane stop. This stops provides for axial positioning of the clamped workpiece or tool. The fact that a weak axial component is superposed on the radial deflection of the clamping jaw is advantageously utilized to draw the workpiece against the surface of the chuck body serving as a stop during clamping.

Depending on the design of the movement converting arrangement, the clamping jaws can be utilized for clamping radially inwards or radially outwards or both radially inwards and radially outwards. Workpieces may then be clamped either at an outer diameter or at an inner diameter. In the embodiment comprising inclined wedge faces on the inner arm of the two-armed lever, clamping may be carried out only radially inwards or radially outwards depending on whether the wedge faces are facing the axis of rotation of the chuck or are turned outwards and are, for example, surrounded by an actuating element which is axially displaceable with the actuating member. Instead of the embodiment comprising inclined wedge faces, an embodiment may be recommended in which the movement converting arrangement has an angle lever which is pivotable relative to the chuck body and is in operative connection with, on the one hand, the axially displaceable actuating member and, on the other, the two-armed lever. The simplest way to connect the actuating member or the two-armed lever with the angle lever such that this connection is effective in both directions is for the angle lever to engage in a circumferential recess, in particular a circumferential groove, in the actuating member and to be pivoted on both the chuck body and the two-armed lever.

In the case of chucks having radially displaceable clamping jaws, the clamping force is dependent on the mass of the clamping jaws and the rotational speed of the chuck. If clamping is carried out radially inwards, the clamping force which is, for example, applied hydraulically decreases when the rotational speed of the chuck increases. This can go so far that the clamping force is no longer adequate. During clamping radially inwards, the effective clamping force is augmented by the centrifugal forces acting on the clamping jaws. Chucks having compensation of centrifugal forces are already known. They are, however, not only relatively complicated in their construction but also do not permit the differences in mass of the various clamping jaws to be taken into account in the case of chucks, in which the actual clamping jaws, also called attachment jaws, are interchangeable. The compensation of centrifugal forces is then highly inadequate, at least for some clamping jaws.

This disadvantage may be avoided for a chuck having a chuck body and clamping jaws displaceable in a radial direction relative thereto in that, in accordance with the invention, a fly weight movable in radial direction relative to the chuck body is associated with each clamping jaw and a two-armed lever pivotable in relation to the chuck body and having a variable lever arm length ratio operatively connects this weight with the clamping jaw such that an inward radial movement of the clamping jaw corresponds to an outward radial movement of the fly weight. If the two-armed lever extends approximately parallel to the axis of rotation of the chuck, the product of the mass of the fly weight × the length of the lever arm associated therewith should be approximately equal to the product of the mass of the clamping jaw × the length of the lever arm associated therewith in order to bring about a compensation of centrifugal forces. Then the fly weight gives rise to a radially inwardly directed force at the clamping jaw which is at least as great as the centrifugal force acting on the clamping jaw. In the inventive construction, the ratio of the length of the two arms of the double-armed lever may be varied in accordance with the bulk of the clamping jaw. This means that the compensation of centrifugal forces can be adjusted to suit the mass of any clamping jaw which is attachable to the chuck. In addition, compensation of centrifugal forces can be achieved at low constructional cost.

The two-armed lever could be designed in the manner of a telescope. However, in a preferred embodiment of the invention the point about which the two-armed lever tilts may simply be shifted relative to the lever. This may be achieved from a constructional point of view in that, in particular, a pivot bearing which is adjustable lengthwise of the two-armed lever is mounted in the chuck body for displacement in the longitudinal direction of the lever. This pivot bearing could be shaped, for example, like a spherical segment ring which may be fastened to a bolt-like two-armed lever by means of a setscrew or the like. However, a construction is preferred, in which the pivot bearing is designed as a nut threaded onto an external thread of the two-armed lever.

Further details and advantages of the invention will be explained in greater detail in the following in conjunction with the drawings, in which.

Figure 1:
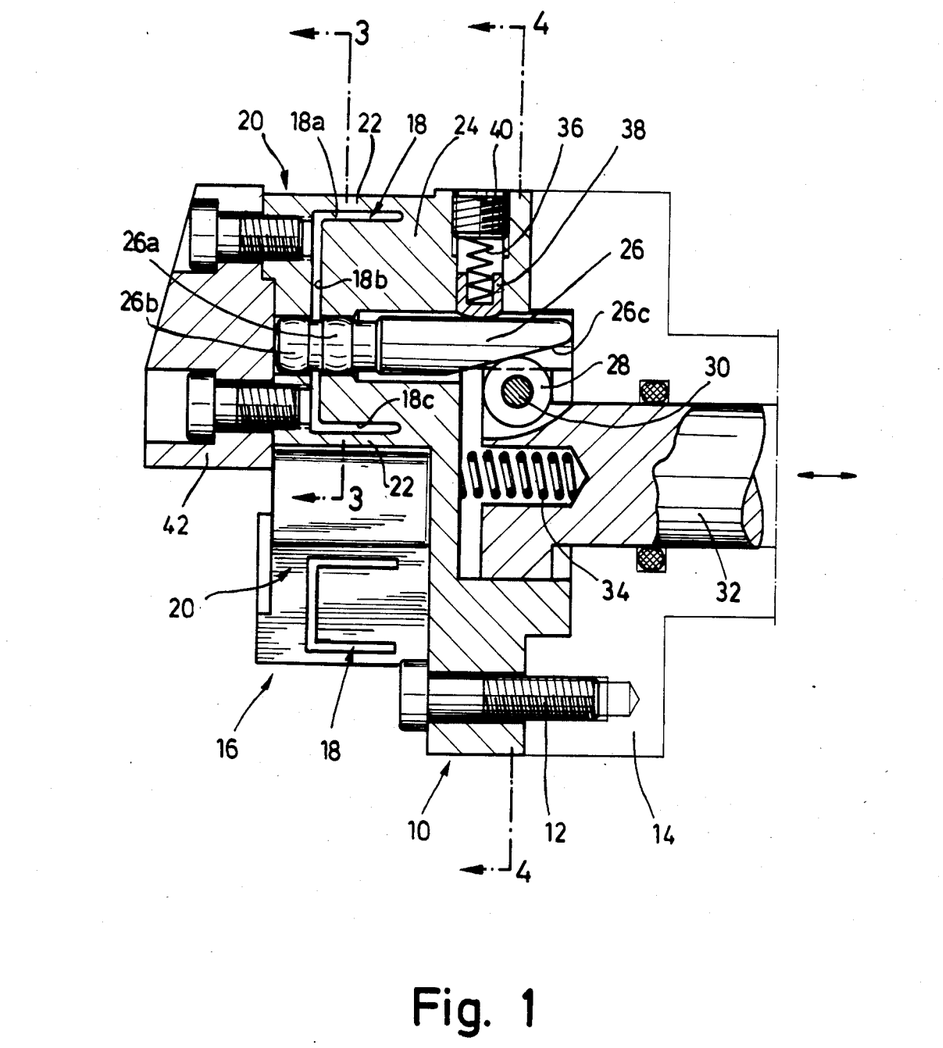
FIG. 1 shows an axial longitudinal section through a preferred embodiment of an inventive chuck.
Figure 2:
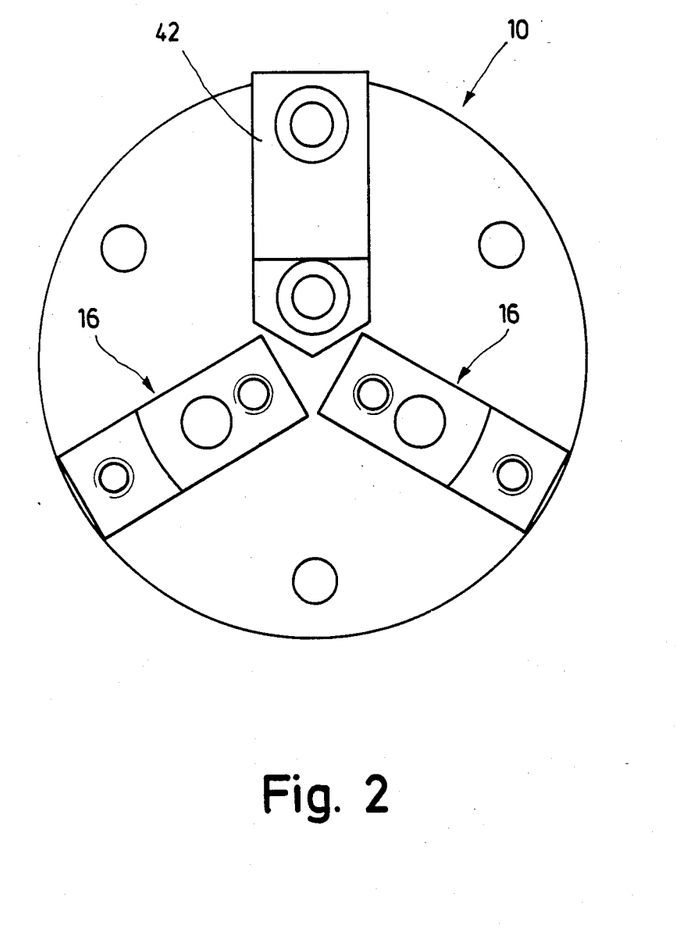
FIG. 2 is a front view of the chuck according to FIG. 1.
Figure 3:
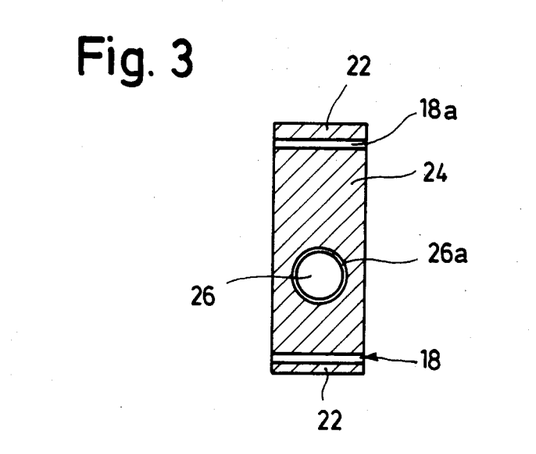
FIG. 3 is a partial radial cross section through the chuck of FIG. 1 along the line 3—3 in this Figure.

FIGS. 1 and 2 show in detail a cylindrical chuck body 10 attached by machine screws 12 to the free end of a spindle 14 adapted for rotational drive. The chuck body 10 is provided on its free end face with integrally formed projections 16 which are, according to the cross-sectional illustration of FIG. 1, divided by a C-shaped or U-shaped slot 18 into a so-called main jaw 20, designated in the following simply as clamping jaw, two arms 22 and a remaining block 24 which is considered to be part of the chuck body 10 in the following description. Each slot 18 has two axially extending slot portions 18a and a slot portion 18b extending substantially in radial direction and connecting the slot portions 18a.

The axially extending arms 22 are deflectable in a radial direction and each pair of arms holds the clamping jaw 20 associated therewith in the manner of a parallelogram link arrangement. The width of the arms 22 in the circumferential direction and their distance from one another guarantee the positional rigidity of the clamping jaws 20 in all other directions of movement.

The clamping jaws 20 of the chuck under consideration are actuated via a wedge face arrangement which has a two-armed lever 26 for each clamping jaw 20. Each of the levers 26 is mounted for pivoting movement in the chuck body 10 or in the respective remaining block 24 by a spherically designed, annular support surface 26a. The lever 26 engages in an associated aperture in the clamping jaw 20 with a second spherical, annular support surface 26b. The arm of the lever 26 facing the clamping jaw 20 is relatively short whereas the second lever arm remote from the clamping jaw 20 is relatively long and has an inclined face 26c in the vicinity of its free end. This inclined face 26c interacts with a roller 28, which is rotatably seated on an axle 30 secured to an actuating member. In the embodiment, this actuating member is formed by a chuck piston 32 which is guided for sliding displacement in an axial bore in the chuck body 10 and the spindle 14, respectively, and is acted upon by a pressure medium which has the tendency to move the piston 32 to the left (in FIG. 1). A return spring 34 which is supported on one side on the chuck body and on the other in a bore of the piston 32 serves to return the piston 32 to its original position.

When the piston moves to the left, the long right arm of the lever 26 is raised such that it is pivoted about its support surface 26a and, with its short left arm, causes a radial inward movement of the clamping jaw 20, the arms 22 hereby being deflected radially inwards. Upon return movement of the piston 32, the clamping jaw 20 is returned radially outwards to a neutral position due to the spring effect of the arms 22. When a pressure spring 36 is provided in development of the invention, as illustrated in FIG. 1, this pressure spring being arranged in a bore of the chuck body 10 and acting on the right arm of the lever 26 via a cap 38, the clamping jaw 20 is moved still further radially outwards, relative to its neutral position, until the spring force of the arms 22 balances the spring force of the pressure spring 36 transmitted through the lever 26 or the long lever arm abuts on the roller of the piston 32 in its rearmost position. In this way, greater radial travel of the clamping jaws 20 may be realized. In this respect, it should be noted that the spring force of the spring 36 is adjustable from outside the chuck body 10 by means of an adjusting screw 40.

Figure 4:
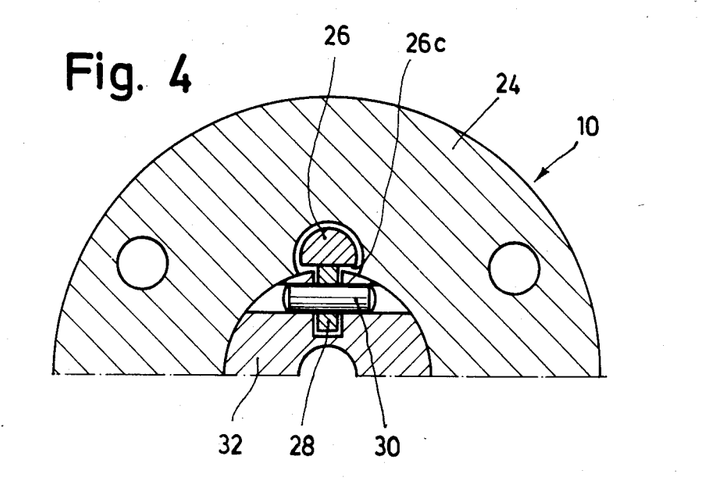
FIG. 4 is a partial radial cross section through the chuck of FIG. 1 along the line 4—4 in this Figure.

In this embodiment, an attachment jaw 42 is screwed to the free end face of each clamping jaw 20. Interchangeable sets of attachment jaws serve to adapt the chuck to the shape or diameter of the workpiece to be clamped and may easily be replaced if they become worn. In FIGS. 1 and 2, one of the clamping jaws 20 is provided with an attachment jaw 42. It is understood in this respect that during operation an attachment jaw 42 is connected or screwed to each of the clamping jaws 20. As shown in FIG. 1, the inner side of the attachment jaw 42 serves at the same time as an axial stop for the short lever arm of the lever 26. Furthermore, it is clear from FIG. 4 that any undesired rotation of the lever 26 is avoided by the interaction of the inclined face 26c and the roller 28.

As mentioned at the outset, the slots are preferably formed by wire erosion. However, the slots could, starting from the side faces of the projections 16, be produced by electrochemical corrosion using a C-shaped tool. It is also possible to produce the arms 22 and the clamping jaws 20 as separate components and to screw them together and to the chuck body 10 or connect them in a different manner. The one-piece construction according to the embodiment described above is, however, preferred. It has proven advantageous, with this integral construction, to have the slots 18 filled immediately after their completion with an elastic filling material. When a suitable, relatively pliable polymeric material is selected, this results in only a slight stiffening of the arm/clamping jaw arrangement and, during operation, reliably prevents penetration by particles of dirt or turnings etc. Altogether, production of the inventive chuck in the manner described is very cheap since the chuck body can be completely finished and subjected to heat treatment prior to the slots being formed by wire erosion as the last stage.

An additional, essential advantage of the inventive chuck is the fact that, due to the parallelogram link arrangement for the clamping jaws, every radial deflection of these jaws automatically results in a certain axial component of movement which may be utilized to draw a tool or workpiece against the end face of the chuck during clamping and axially position the tool or workpiece in this way. It is hereby particularly advantageous for the relevant end face region of the chuck to be subjected to a corresponding finishing treatment so that it can serve as a plane stop for the tool or workpiece.

The slots of the embodiment described above in conjunction with FIGS. 1 to 4 have slot portions 18a which extend substantially in an exact axial direction and slot portions 18b which extend substantially in an exact radial direction, the latter connecting the outer ends of the axially extending slot portions 18a. In development of the invention, it is also possible to extend the outer or forward ends of the axial slot portions 18a beyond their respective points of connection with the radially extending slot portion 18b so that an H-shaped slot profile is obtained instead of a C-shaped slot profile. This can be advantageous when a greater material strength is required, especially in the central portion of the clamping jaw, for, for example, application of the outer lever end or for forming a screw connection with an attachment jaw.

Figure 5:
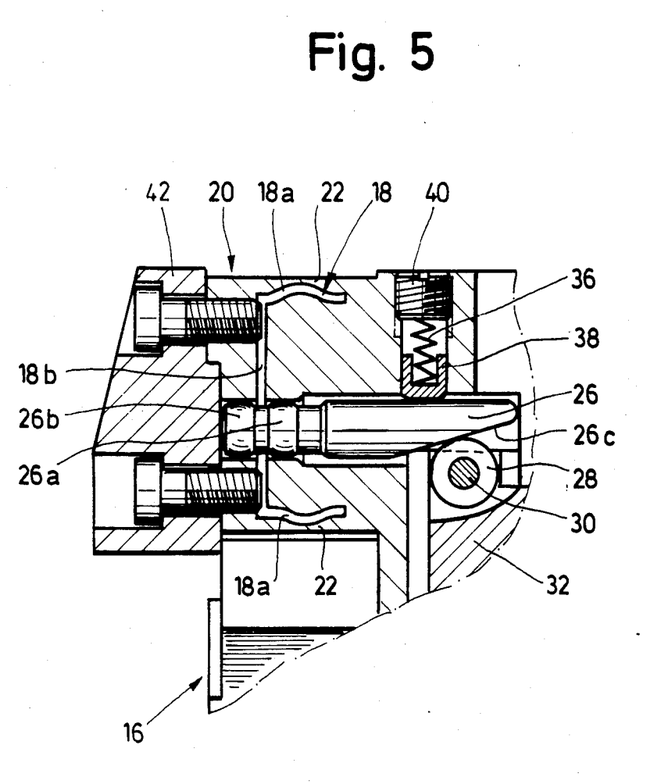
FIG. 5 is a partial longitudinal section of an embodiment modified with regard to the slot profile or rather the shape of the arms.

As shown in FIG. 5, the slot portions 18a extending substantially in axial direction may also, in development of the invention, be curved radially inwards or outwards, respectively, such that the resulting arm profile, in axial direction, narrows in the centre and widens at the ends, i.e. adjacent the chuck body and adjacent the clamping jaw. The variation in cross section in the longitudinal direction of the arms 22 is hereby selected such that a constant bending stress is obtained for each radial arm cross section.

Moreover, it is clear from the above description that the difference in arm lengths of the two-armed lever, in the inventive chuck, may be utilized for advantageous transmission of the axial force generated by the actuating member or chuck piston. Optimum points of force application hereby result for the various forces. It is a particular advantage of the inventive wedge face arrangement that the tolerances of the actuating member or the chuck piston and/or the piston aperture are, in their effect on the exact positioning of the clamping jaws, reduced to a fraction corresponding to the transmission ratio of the two-armed lever.

The embodiment shown in FIGS. 6 to 8 will be described in the following only insofar as this differs from the embodiment of FIGS. 1 to 5.

In this embodiment, a chuck piston 32' has a circumferential groove 28'. An arm 52' of an angle lever designated as a whole as 50' is provided for each main or clamping jaw 42' and engages in this groove. The angle lever is mounted for pivoting movement in the chuck body by means of two bearing pins 54' (see FIG. 7) and has a second arm 56' in which a coupling pin 58' is secured. As shown in FIG. 8, this pin penetrates a bore 59' in the right arm (according to FIG. 6) of a two-armed lever designated as a whole as 26'. This lever is, in the same way as the lever 26 of the embodiment according to FIGS. 1 to 5, mounted in the chuck body 10' for tilting or pivoting movement and is in operative connection with the clamping jaw 20'. Any displacement of the chuck piston 32' to the left, in accordance with FIG. 6, results in the angle lever 50' being pivoted in the clockwise direction about the bearing pins 54'. This results in the lever 26' being tilted in the clockwise direction as well and the clamping jaw 20' being displaced in an outward radial direction. In the reverse case, any displacement of the chuck piston 32' to the right in FIG. 6 causes the clamping jaw 20' to be displaced in an inward radial direction. In this respect, displacement is always referred to in relation to the axis of rotation of the chuck which is designated in FIG. 6 as 60'.

This second embodiment is provided, in addition, with a compensation of centrifugal forces. For this purpose, a fly weight 62' is guided in the chuck body 10' for displacement in a radial direction. It is also coupled with the associated clamping jaw 20' via a two-armed lever 64' in such a manner that the centrifugal force acting on the fly weight 62' when the chuck rotates is converted into a counter-balancing force which is directed radially inwards and acts on the clamping jaw 20'. This force is intended to compensate for the centrifugal force acting on the clamping jaw 20'. The two-armed lever 64' is, in the same way as the two-armed lever 26', mounted in a channel-like passage 68' in the chuck body 10' for tilting or pivoting movement by means of a spherical, annular support surface which is formed by a nut 70'. This is threaded onto an external thread 72' of the two-armed lever 64', is supported against the wall of the channel-like passage 68' designed as a bore and bears a small securing pin 76' which engages in a groove 78' extending along the passage 68' to secure the nut 70' against rotation. In order to alter the ratio of the lever arm lengths of the two-armed lever 64' in relation to one another, this lever is itself rotated about its longitudinal axis. For this purpose it is provided with a hexagonal recess 80' for insertion of a spanner. At its two ends the two-armed lever 64' is provided with additional spherical, annular support surfaces 82' and 84', with which it is supported against the walls of bores 86' and 88' in the clamping jaw 20' and the chuck body 10', respectively. Finally, the two-armed lever 64' is provided in the region of the support surface 84' with small borings 90', into which a detent ball 94' is pressed by a pressure spring 92' to prevent any unintentional rotation of the two-armed lever 64'.

It is obvious that this procedure could be reversed, i.e. the nut 70' arranged for rotation but secured against any unintentional rotation and the two-armed lever 64' prevented from rotating about its longitudinal axis.

Figure 6:
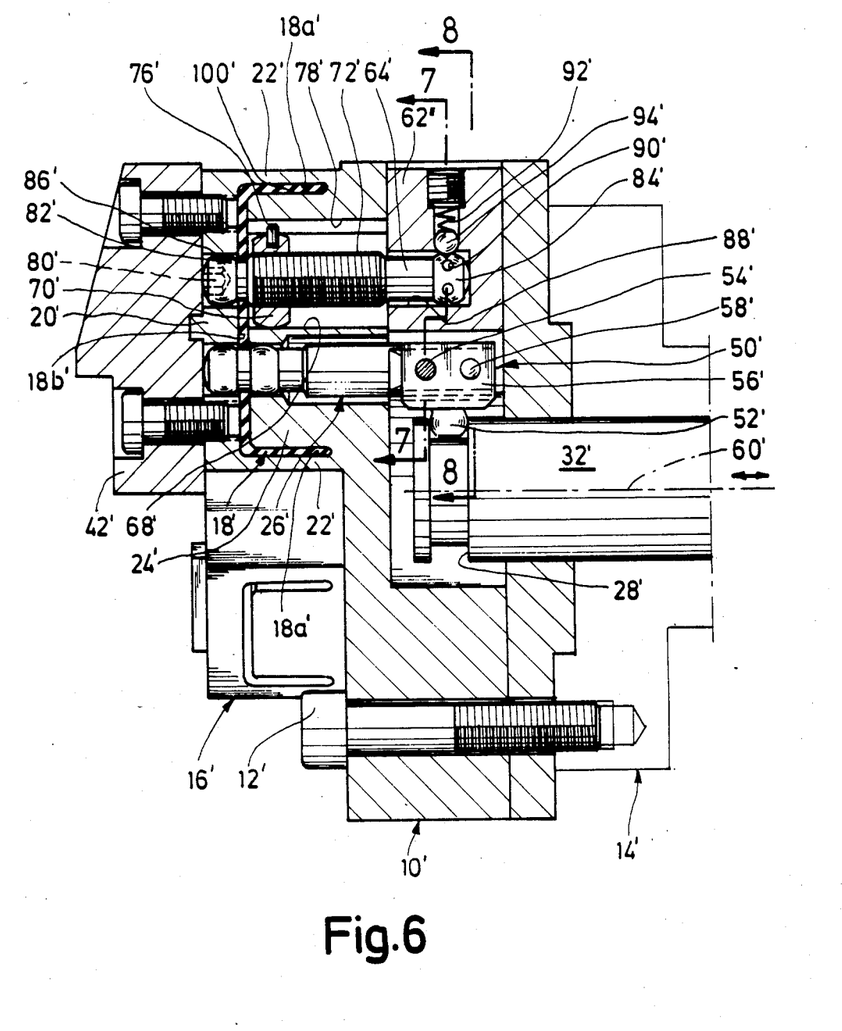
FIG. 6 is an axial longitudinal section through a second advantageous embodiment of the inventive chuck and FIGS. 7 and 8 show partial radial cross sections along the lines 7—7 and 8—8 in FIG. 6.
Figure 7:
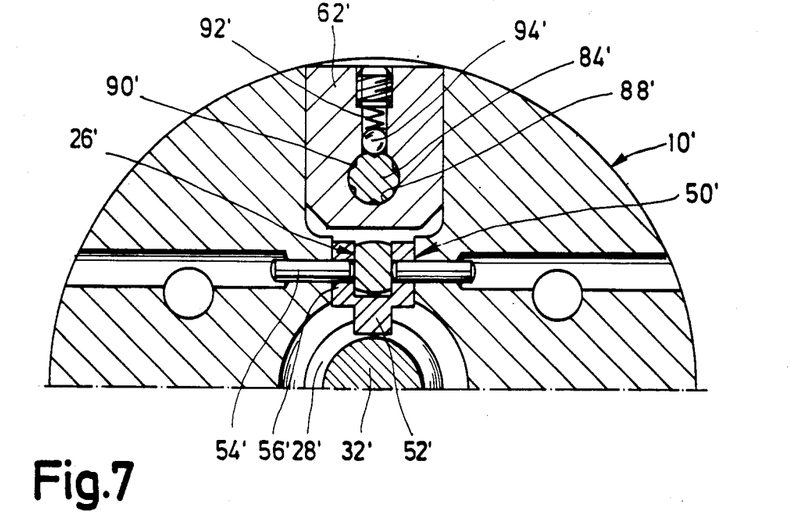
Figure 8:
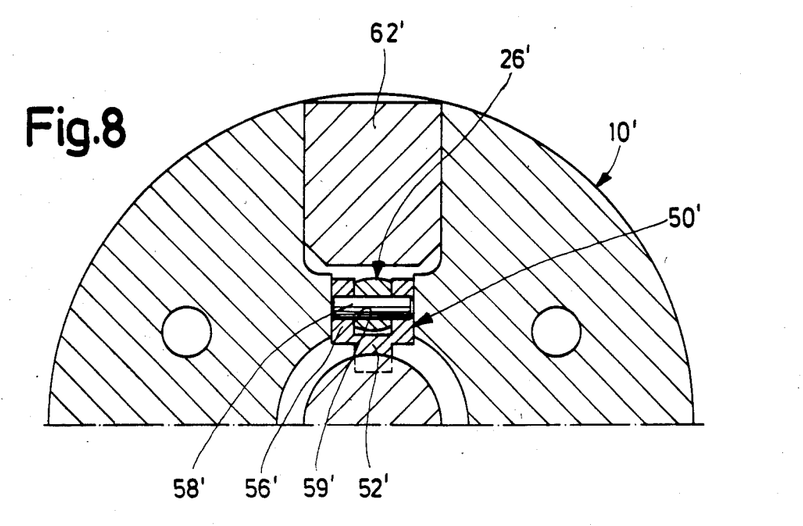

In the construction shown in FIGS. 6 to 8, it is possible to have the centrifugal forces acting on the fly weights 62' always compensating for the centrifugal forces acting on the jaws 20', 42' by altering the position of the pivot point of the two-armed lever 64', and therewith the ratio of the lever arm lengths, in response to the mass of the clamping jaws 20', in particular the attachment jaw 42'.

The ball detent means for the two-armed lever 64' has the advantage that partial rotations of the two-armed lever may be counted and so the position of the pivot point formed by the nut 70' may be determined via the pitch of the external thread 72'.

In principle, it would be conceivable for the fly weight to engage on the two-armed lever 26' serving to displace the clamping jaw 20' and for this lever to be provided with an adjustable point of rotation in a suitable manner. However, it would then be necessary for the machine control to take the alteration in the transmission ratio into account during adjustment of the point of rotation or pivot for the two-armed lever since a particular distance of travel of the chuck piston 32' then no longer causes the clamping jaws 20' to travel the same distance as before.

The reference numeral 100' indicates a silicon rubber filling in the slots 18'. This filling material is intended to prevent any dirt, in particular shavings or turnings, entering the slots and obstructing the free mobility of the arms 22'.

What is claimed is:

1. A chuck comprising a chuck body, clamping jaws displaceable in a radial direction relative to said chuck body, an actuating member movable in an axial direction relative to said chuck body and an arrangement for converting movement to bring about a radial adjusting movement of said clamping jaws in response to an axial adjusting movement of said actuating member, characterized in that each of said clamping jaws is connected with said chuck body via a pair of arms extending approximately in an axial direction, said arms being resiliently deflectable in a substantially radial direction and acting as a parallel spring link, and that said movement converting arrangement has for each clamping jaw a two-armed lever mounted for pivoting movement relative to said chuck body, an outer arm of said lever being in operative connection with an associated clamping jaw and an inner arm of said lever being in operative connection with said actuating member so as to bring about a pivoting movement of said lever about a pivot axis in response to an axial movement of said actuating member.

2. Chuck as defined in claim 1, characterized in that each of said arms is designed as a flat, leaf spring-type arm.

3. Chuck as defined in claim 1, characterized in that a cross section of said arms in an axial direction is selected such that a constant bending stress results along each of said arms.

4. Chuck as defined in claim 1, characterized in that said clamping jaws are designed in one piece with said chuck body and are each separated from said body by a slot defining the two arms and separating the relevant clamping jaw from said chuck body.

5. Chuck as defined in claim 4, characterized in that each of said slots comprises two slot portions extending substantially in an axial direction and another slot portion extending substantially in a radial direction and connecting said two slot portions.

6. Chuck as defined in claim 5, characterized in that said another slot portion extending substantially in a radial direction is outwardly curved towards an associated clamping jaw.

7. Chuck as defined in claim 4, characterized in that each of said slots is filled with an elastically deformable filling material at least in a region of open ends of the slots.

8. Chuck as defined in claim 4, characterized in that open ends of said slots are closed by cover members.

9. Chuck as defined in claim 1, characterized in that said levers serving to convert movement and transmit force are connected with an associated clamping jaw and said chuck body via ball joint connections.

10. Chuck as defined in claim 1, characterized in that an interchangeable attachment jaw is detachably connected with each of said clamping jaws.

11. Chuck as defined in claim 1, characterized in that a central end face region of said chuck body located between radially inward ends of said clamping jaws or the arms is designed as a plane stop.

12. Chuck as defined in claim 1, characterized in that said movement converting arrangement is designed as a wedge face arrangement, that each of said levers is mounted for pivoting movement in said chuck body, that the outer arm of each lever is connected with an associated clamping jaw and that the inner arm of each lever is provided with an inclined, axially extending wedge face for cooperation with said axially displaceable actuating member.

13. Chuck as defined in claim 12, characterized in that for cooperation with each wedge face said actuating member bears a rotatably mounted roller.

14. Chuck as defined in claim 12, characterized in that the inner arms of said levers are each acted upon by a radially inwardly directed spring force.

15. Chuck as defined in claim 14, characterized in that pressure springs are provided in associated apertures in said chuck body to generate said radially inwardly directed spring force.

16. Chuck as defined in claim 1, characterized in that said movement converting arrangement has an angle lever which is pivotable relative to said chuck body and is in operative connection with said actuating member and with said lever.

17. Chuck as defined in claim 16, characterized in that said angle lever engages in a circumferential recess in said actuating member and is pivoted on both said chuck body and said lever.

18. Chuck as defined in claim 1, characterized in that a fly weight movable in a radial direction relative to said chuck body is associated with each clamping jaw and a second two-armed lever pivotable in relation to said chuck body and having a variable lever arm length ratio operatively connects said weight with said clamping jaw such that an inward radial movement of said clamping jaw corresponds to an outward radial movement of said fly weight.

19. Chuck as defined in claim 18, characterized in that a pivot bearing adjustable lengthwise of said second two-armed lever is mounted in said chuck body for displacement in a longitudinal direction of said second lever.

20. Chuck as defined in claim 19, characterized in that said pivot bearing is designed as a nut threaded onto an external thread of said second two-armed lever.

21. Chuck as defined in claim 20, characterized in that said nut is guided in said chuck body so as to be secured against rotation and said second two-armed lever is rotatable about a longitudinal axis.

22. Chuck as defined in claim 21, characterized by a spring detention means securing said second two-armed lever against rotation.

* * * * *